United States Patent [19]
Tojo et al.

[11] 4,227,773
[45] Oct. 14, 1980

[54] OBJECTIVE LENS SYSTEM FOR MICROSCOPES

[75] Inventors: Tsutomu Tojo; Toshifumi Uetake, both of Hachiouji, Japan

[73] Assignee: Olympus Optical Co., Ltd., Tokyo, Japan

[21] Appl. No.: 936,394

[22] Filed: Aug. 24, 1978

[30] Foreign Application Priority Data

Aug. 26, 1977 [JP] Japan ................................ 52-102358

[51] Int. Cl.³ .......................... G02B 9/34; G02B 9/60
[52] U.S. Cl. ........................... 350/175 ML; 350/217; 350/222
[58] Field of Search ............... 350/175 ML, 176, 177, 350/217, 222

[56] References Cited

U.S. PATENT DOCUMENTS

| 2,336,207 | 12/1943 | Aklin | 350/222 |
| 2,611,295 | 9/1952 | Schade | 350/176 |
| 3,572,902 | 3/1971 | Uetake | 350/175 ML |
| 3,883,231 | 5/1975 | Koizumi | 350/222 X |

FOREIGN PATENT DOCUMENTS

| 565566 | 12/1932 | Fed. Rep. of Germany | 350/217 |
| 548253 | 10/1942 | United Kingdom | 350/222 |
| 548255 | 10/1942 | United Kingdom | 350/222 |
| 233964 | 5/1969 | U.S.S.R. | 350/217 |

*Primary Examiner*—Paul A. Sacher
*Attorney, Agent, or Firm*—Cushman, Darby & Cushman

[57] ABSTRACT

An objective lens system for microscopes consisting of a front lens group comprising a positive lens component and a meniscus lens component having a concave surface on the image side, and a rear lens group comprising at least a meniscus cemented lens component, a positive lens component and at least one cemented three-element lens component. Said objective lens system is so designed as to have a large numerical aperture, secondary spectrum sufficiently minimized, a long working distance and curvature of field, coma etc. favorably corrected over a wide range of visual field.

11 Claims, 9 Drawing Figures

OBJECTIVE LENS SYSTEM FOR MICROSCOPES

BACKGROUND OF THE INVENTION (a) Field of the Invention

The present invention relates to a Gauss type low-magnification objective lens system for microscopes.

(b) Description of the Prior Art

There are conventionally known objective lens systems designed as the Gauss type. It is also known to use a three-element lens component in such lens systems to correct chromatic aberration, especially for eliminating the secondary spectrum. However, there are conventionally known few objective lens systems which can provide a flat image plane over a wide visual field in combination with a long working distance and large numerical aperture. Further, correction of chromatic aberration poses a difficult problem for such objective lens systems.

SUMMARY OF THE INVENTION

It is therefore a general object of the present invention to provide a plane apochromat class of objective lens system for microscopes which assures flatness of image plane over an ultra wide visual field and has a very long working distance.

A difficult problem encountered in designing an objective lens system for microscopes is to favorably correct chromatic aberration, i.e., to design an objective lens system in which chromatic aberration is corrected in optimum condition within a practically permissible range by adequately selecting materials for respective lens elements and properly distributing refractive indices among respective lens elements.

In order to correct chromatic aberration, it is required to control light dispersion as low as possible in lens elements arranged on the object side. In the Gauss type lens system in which rays pass at large angles relative to the optical axis, chromatic aberration can be corrected by arranging a thick lens element as a front lens component of said lens system.

The objective lens system for microscopes according to the present invention is designed as the Gauss type which is well known in the field of the photographic lens systems, and is so adapted as to favorably correct chromatic aberration by using a cemented three-element lens component as the image side lens component of those arranged with concave surfaces facing each other or a lens component arranged at a later stage.

The objective lens system for microscopes according to the present invention has a fundamental composition consisting of a front lens group and a rear lens group. Said front lens group comprises a first positive lens component and a second cemented meniscus lens component having a concave surface facing toward a third lens component arranged on the next stage. Said rear lens group comprises a third cemented meniscus lens component having a concave surface facing toward said second lens component and a fourth positive lens component. Said rear lens group comprises at least one three-element cemented lens component which may be said third lens component or an additional lens component.

Further, the objective lens system according to the present invention is characterized in that it satisfies the conditions enumerated below:

(1) $0.12f < \Sigma d/n < 0.35f$
(2) $45 \leq |\nu_p - \nu_n| + |\nu_{n'} - \nu_{p'}| \leq 105$
(3) $0.5 < |r_6/r_5| < 1.6$ wherein the reference symbols represent as follows:

$\Sigma d/n$: total sum of ratios between thicknesses and refractive indices of the respective lens elements on the third lens component $\nu_p$: Abbe's number of the first lens component $\nu_n$: Abbe's number of the negative lens element of the second lens component $\nu_{n'}$: Abbe's number of the negative lens element of the third lens component $\nu_{p'}$: Abbe's number of the positive lens element of the third lens component $r_5$, $r_6$: radii of curvature on the image side surface of the second lens component and object side surface of the third lens component respectively The condition (1) is required for correcting coma, especially that for the oblique rays at an ultra wide visual field having a field number of about 30. If $\Sigma d/n$ is smaller than the lower limit of the condition (1), coma will be extremely aggravated, made asymmetrical and, in addition, chromatic aberration will not be corrected so favorably for an apochromat objective lens system. If the upper limit of the condition (1) is exceeded, in contrast, lateral chromatic aberration will be remarkably undercorrected and, further, vignetting for oblique rays will be remarkable at wide field angles, thereby making marginal ray intensity insufficient.

The condition (2) defines overall difference in dispersion power for the achromatic lens and is effective for adequately balancing longitudinal chromatic aberration with lateral chromatic aberration in the lens system. If $|\nu_p - \nu_n| + |\nu_{n'} - \nu_{p'}|$ is smaller than the lower limit of the condition (2), lateral chromatic aberration will be remarkably undercorrected when longitudinal chromatic aberration is corrected sufficiently, and cannot be corrected by the cemented lens component, thereby making it impossible to accomplish the object of the present invention. If the upper limit of the condition (2) is exceeded, longitudinal chromatic aberration will be remarkably overcorrected when lateral chromatic aberration is corrected sufficiently and, in addition, flare may be produced to degrade image contrast.

The condition (3) is defined for designing the lens system of the Gauss type and determining radii of curvature on the concave surfaces facing each other of the second and third lens components in the Gauss type lens system. This condition is effective to correct curvature of field. If $|r_5/r_6|$ exceeds the upper limit of the condition (3), Petzval's sum will be large enough to degrade flatness of the image plane. If $|r_5/r_6|$ is smaller than the lower limit of the condition (3), in contrast, coma will be aggravated though Petzval's sum can be minimized.

FIG. 1 shows a lens system comprising a rear lens group consisting of a third cemented three-element lens component and a fourth positive lens component, whereas FIG. 3 illustrates a lens system improved on the basis of that shown in FIG. 1, i.e., a lens system in which a doublet meniscus lens is used as the third lens component and a cemented three-element lens is added as the fifth lens component in the rear lens group. That is to say, the lens system shown in FIG. 3 comprises a first positive lens component, a second meniscus lens component, a third cemented doublet meniscus lens component, a fourth positive lens component and a fifth cemented three-element lens component. This lens system is characterized in that it satisfies the conditions (1)

through (3) for the reasons already described above in this patent specification. However, the reference symbol $\nu_n$ used in the condition (2) represents Abbe's number of the second lens component since a single-element lens component is used in place of the cemented doublet lens component as the second lens component. Similarly, the reference symbols $\nu_{p'}$ and $\nu_{n'}$ used in the condition (2) represent Abbe's numbers of the image side lens element of the third lens component and the object side lens element of the third lens component since a cemented doublet lens component is used in place of the cemented three-element lens component as the third lens component. The objective lens system having such a composition as shown in FIG. 3 is so designed as to satisfy the following conditions additionally and is more effective to accomplish the object of the present invention:

$$\frac{\theta_4}{\nu_5} \cdot \frac{\theta_5}{\nu_4} \simeq 0.001 \quad (4)$$

$$(5)\ 1.85 > n_1 > 1.7$$

$$0.2f < \frac{d_4}{n_3} + d_5 + \frac{d_6}{n_4} + \frac{d_7}{n_5} < 0.8f \quad (6)$$

$$1 < (\frac{n_5 - 1}{|r_9|})f < 3.5 \quad (7)$$

$$0.5 < (\frac{n_7 - 1}{|r_{11}|})f < 2.5 \quad (8)$$

wherein the reference symbols represent as defined below:

$r_9$, $r_{11}$: radii of curvature of the image side surface of the third lens component and the image side surface of the fourth lens component respectively $d_4$, $d_6$, $d_7$: thicknesses of the second lens component and both the lens elements of the third lens component respectively $d_5$: airspace between the second and third lens components $n_1$, $n_3$, $n_4$, $n_5$, $n_7$: refractive indices of the first lens component, the second lens component, both the lens elements of the third lens component and the fourth lens component $\nu_4$, $\nu_5$: Abbe's numbers of both the lens elements of the third lens component $\theta_4$, $\theta_5$: values of both the lens elements of the third lens component determined by $$\theta = \frac{n_g - n_F}{n_F - n_C}$$

f: focal length of the entire lens system as a whole

The condition (4) is required for minimizing the secondary spectrum of chromatic aberration which remarkably degrades resolution at the central portion of image by selecting extraordinarily dispersive materials for the convex and concave lens elements of the third lens component. In said lens system, chromatic aberration produced by the first and second lens components is corrected by selecting a material having a large value of $\theta$ for the convex lens elements of the third lens component and a material having a small value of $\theta$ for the concave lens element of the third lens component.

The condition (5) is defined to minimize adverse effect on spherical aberration at a large aperture by selecting a material having high refractive index for the front lens component. Speaking more concretely, the condition (5) is adopted for selecting high refractive index to make a large radius of curvature usable since a small radius of curvature will unavoidably aggravate spherical aberration. If $n_1$ is smaller than the lower limit of the condition (5), spherical aberration will be aggravated. If $n_1$ exceeds the upper limit of the condition (5), in contrast, the first lens component will have a very small radius of curvature and lose the function to correct the other aberrations.

The condition (6) defines the condition (1) further strictly and is effective for correcting more favorably the aberrations which are already described with reference to the condition (1).

The conditions (7) and (8) are necessary to correct astigmatic difference and asymmetrical coma. If the upper limits of the conditions (7) and (8) are exceeded, astigmatism will be undercorrected and inner asymmetrical coma will be aggravated: If $$(\frac{n_5 - 1}{|r_9|})f \text{ and } (\frac{n_7 - 1}{|r_{11}|})f$$

are smaller than the lower limits of the conditions (7) and (8), astigmatic difference will be overcorrected and, in addition, outer asymmetrical coma will be aggravated.

The objective lens system having such a composition as shown in FIG. 3 can further be improved by defining the condition (2) as follows: $45 \leq |\nu_1 - \nu_3| + |\nu_4 - \nu_5| \leq 90$

DETAILED DESCRIPTION OF THE PREFERRED EMBODIMENTS

Figure 1:
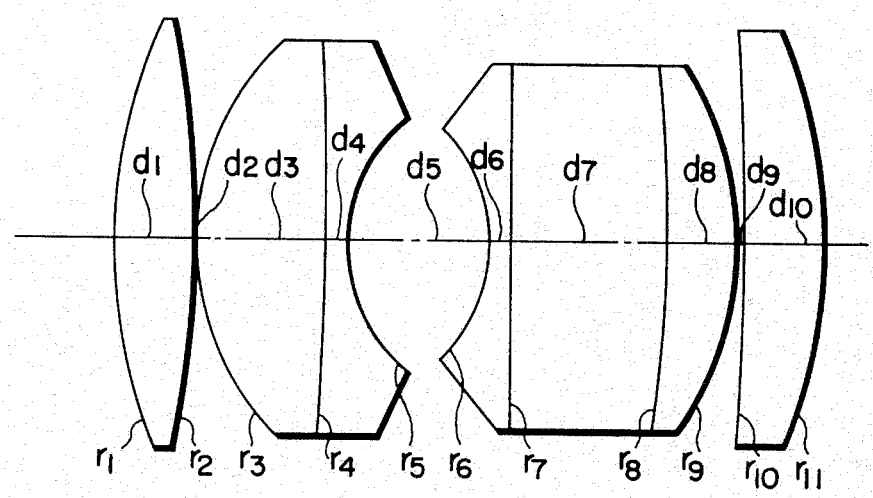
FIG. 1 shows a sectional view illustrating the composition of the Embodiment 1 of the present invention.
Figure 2:
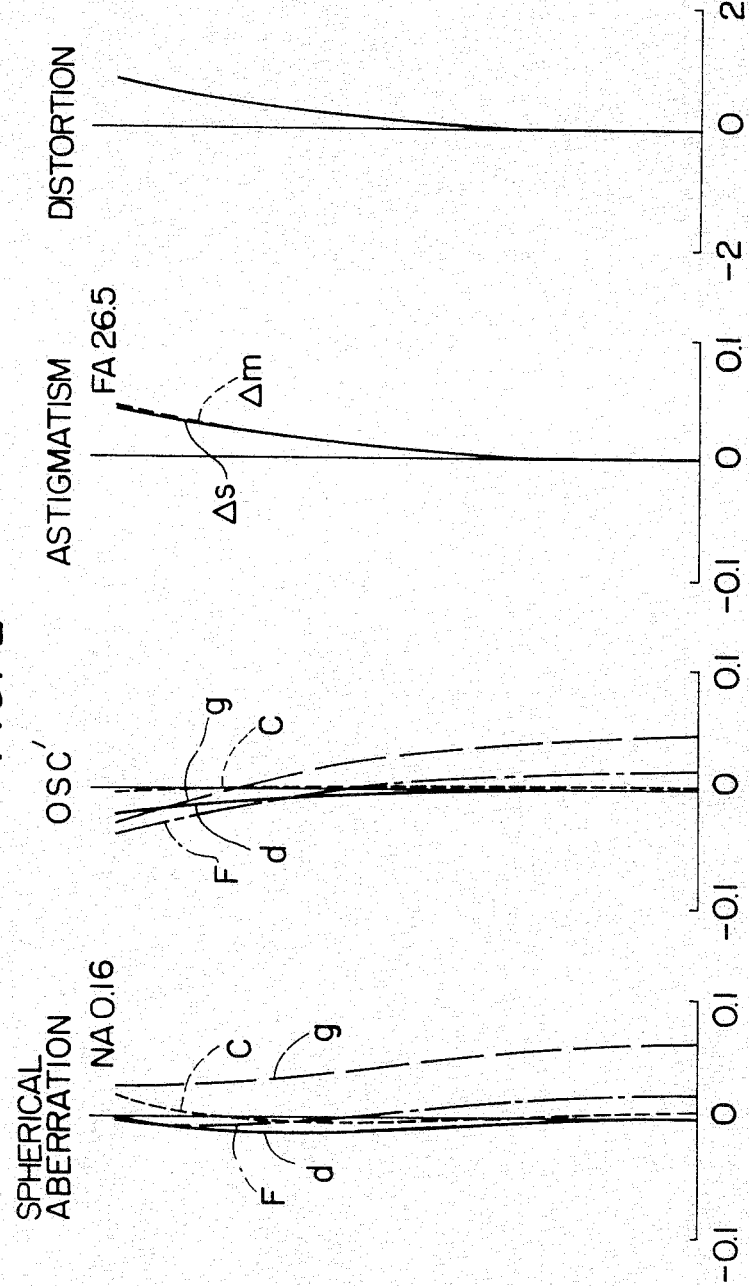
FIG. 2 shows curves illustrating the aberration characteristics of the Embodiment 1.

Now, some preferred embodiment of the objective lens system for microscopes according to the present invention will be described with reference to the accompanying drawings.

EMBODIMENT 1

$f = 1.0$  N.A $= 0.16$  $\beta = 4X$  W.D $= 0.7141$

| | | | | | |
|---|---|---|---|---|---|
| $r_1 = 0.4823$ | | | | | |
| | $d_1 = 0.0814$ | | $n_1 = 1.49250$ | | $\nu_1 = 81.90$ |
| $r_2 = 1.1061$ | | | | | |
| | $d_2 = 0.0044$ | | | | |
| $r_3 = 0.2743$ | | | | | |
| | $d_3 = 0.1278$ | | $n_2 = 1.65844$ | | $\nu_2 = 51.33$ |
| $r_4 = 3.7731$ | | | | | |
| | $d_4 = 0.0235$ | | $n_3 = 1.53256$ | | $\nu_3 = 45.61$ |
| $r_5 = 0.1584$ | | | | | |

EMBODIMENT 1-continued $r_6 = -0.1602$
$d_5 = 0.1440$
$d_6 = 0.0223$ $n_4 = 1.72825$ $\nu_4 = 29.23$
$r_7 = -20.3323$
$d_7 = 0.1579$ $n_5 = 1.43389$ $\nu_5 = 95.15$
$r_8 = -1.3149$
$d_8 = 0.0721$ $n_6 = 1.63854$ $\nu_6 = 54.91$
$r_9 = -0.3140$
$d_9 = 0.0044$
$r_{10} = -4.8690$
$d_{10} = 0.0853$ $n_7 = 1.49250$ $\nu_7 = 81.90$
$r_{11} = -0.4933$

EMBODIMENT 2

$f = 1.0$   $N.A = 0.16$   $\beta = -4X$   $W.D = 0.2736$
$r_1 = 0.6326$
$d_1 = 0.0624$ $n_1 = 1.83400$ $\nu_1 = 37.19$
$r_2 = -1.5353$
$d_2 = 0.0054$
$r_4 = 0.2435$
$d_4 = 0.1373$ $n_3 = 1.71300$ $\nu_3 = 53.89$
$r_5 = 0.1401$
$d_5 = 0.1504$
$r_6 = -0.1409$
$d_6 = 0.2035$ $n_4 = 1.61340$ $\nu_4 = 43.84$
$r_7 = -1.5682$
$d_7 = 0.0817$ $n_5 = 1.49700$ $\nu_5 = 81.60$
$r_9 = -0.3138$
$d_9 = 0.0136$
$r_{10} = 4.8966$
$d_{10} = 0.0817$ $n_7 = 1.43389$ $\nu_7 = 95.15$
$r_{11} = -0.4277$
$d_{11} = 0.0054$
$r_{12} = 3.0712$
$d_{12} = 0.0403$ $n_8 = 1.64000$ $\nu_8 = 60.09$
$r_{13} = 0.4846$
$d_{13} = 0.1150$ $n_9 = 1.49700$ $\nu_9 = 81.60$
$r_{14} = -0.3910$
$d_{14} = 0.0531$ $n_{10} = 1.52130$ $\nu_{10} = 52.55$
$r_{15} = -0.9323$
$\theta = 0.5623$   $\theta = 0.539$   $\dfrac{\theta_4 - \theta_5}{\nu_5 - \nu_4} = 0.000617$

EMBODIMENT 3

$f = 1.0$   $N.A = 0.16$   $\beta = -4X$   $W.D = 0.2753$
$r_1 = 0.6773$
$d_1 = 0.0608$ $n_1 = 1.83400$ $\nu_1 = 37.19$
$r_2 = -1.5184$
$d_2 = 0.0055$
$r_4 = 0.2418$
$d_4 = 0.1382$ $n_3 = 1.72600$ $\nu_3 = 53.56$
$r_5 = 0.1415$
$d_5 = 0.1516$
$r_6 = -0.1406$
$d_6 = 0.2046$ $n_4 = 1.61340$ $\nu_4 = 43.84$
$r_7 = -1.0627$
$d_7 = 0.0822$ $n_5 = 1.49700$ $\nu_5 = 81.60$
$r_9 = -0.3129$
$d_9 = 0.0137$
$r_{10} = 3.0907$
$d_{10} = 0.0822$ $n_7 = 1.43389$ $\nu_7 = 95.15$
$r_{11} = -0.4372$
$d_{11} = 0.0055$
$r_{12} = 3.4568$
$d_{12} = 0.0414$ $n_8 = 1.65160$ $\nu_8 = 58.67$
$r_{13} = 0.4957$
$d_{13} = 0.1287$ $n_9 = 1.49700$ $\nu_9 = 81.60$
$r_{14} = -0.3606$
$d_{14} = 0.0412$ $n_{10} = 1.55781$ $\nu_{10} = 53.85$
$r_{15} = -0.8637$
$\theta_4 = 0.5623$   $\theta_5 = 0.539$   $\dfrac{\theta_4 - \theta_5}{\nu_5 - \nu_4} = 0.000617$

EMBODIMENT 4

$f = 1.0$   $N.A = 0.16$   $\beta = -4X$   $W.D = 0.2732$
$r_1 = 0.6327$

EMBODIMENT 4-continued $d_1 = 0.0602$ $n_1 = 1.83400$ $\nu_1 = 37.19$
$r_2 = -1.4982$
$d_2 = 0.0054$
$r_4 = 0.2441$
$d_4 = 0.1372$ $n_3 = 1.72600$ $\nu_3 = 53.56$
$r_5 = 0.1400$
$d_5 = 0.1504$
$r_6 = -0.1409$
$d_6 = 0.2031$ $n_4 = 1.61340$ $\nu_4 = 43.84$
$r_7 = -1.4709$
$d_7 = 0.0816$ $n_5 = 1.49700$ $\nu_5 = 81.60$
$r_9 = -0.3152$
$d_9 = 0.0136$
$r_{10} = 4.8481$
$d_{10} = 0.0816$ $n_7 = 1.43389$ $\nu_7 = 95.15$
$r_{11} = -0.4291$
$d_{11} = 0.0054$
$r_{12} = 3.0253$
$d_{12} = 0.0410$ $n_8 = 1.65160$ $\nu_8 = 58.67$
$r_{13} = 0.4934$
$d_{13} = 0.1276$ $n_9 = 1.49700$ $\nu_9 = 81.60$
$r_{14} = -0.3929$
$d_{14} = 0.0408$ $n_{10} = 1.52130$ $\nu_{10} = 52.55$
$r_{15} = -0.8983$
$\theta_4 = 0.5623$   $\theta_5 = 0.539$   $\dfrac{\theta_4 - \theta_5}{\nu_5 - \nu_4} = 0.000617$

EMBODIMENT 5

$f = 1.0$   $N.A = 0.16$   $\beta = -4X$   $W.D = 0.2740$
$r_1 = 0.6480$
$d_1 = 0.0604$ $n_1 = 1.83400$ $\nu_1 = 37.19$
$r_2 = -1.4720$
$d_2 = 0.0055$
$r_4 = 0.2452$
$d_4 = 0.1376$ $n_3 = 1.72600$ $\nu_3 = 53.56$
$r_5 = 0.1414$
$d_5 = 0.1508$
$r_6 = -0.1410$
$d_6 = 0.2036$ $n_4 = 1.61340$ $\nu_4 = 43.84$
$r_7 = -1.6897$
$d_7 = 0.0818$ $n_5 = 1.49700$ $\nu_5 = 81.60$
$r_9 = -0.3145$
$d_9 = 0.0136$
$r_{10} = 5.6253$
$d_{10} = 0.0818$ $n_7 = 1.43389$ $\nu_7 = 95.15$
$r_{11} = -0.4267$
$d_{11} = 0.0055$
$r_{12} = 2.9647$
$d_{12} = 0.0411$ $n_8 = 1.64000$ $\nu_8 = 60.09$
$r_{13} = 0.4937$
$d_{13} = 0.1280$ $n_9 = 1.49700$ $\nu_9 = 81.60$
$r_{14} = -0.3936$
$d_{14} = 0.0409$ $n_{10} = 1.52130$ $\nu_{10} = 52.55$
$r_{15} = -0.9338$
$\theta_4 = 0.5623$   $\theta_5 = 0.539$   $\dfrac{\theta_4 - \theta_5}{\nu_5 - \nu_4} = 0.000617$

EMBODIMENT 6

$f = 1.0$   $N.A = 0.16$   $\beta = -4X$   $W.D = 0.3055$
$r_1 = 2.1020$
$d_1 = 0.0527$ $n_1 = 1.80400$ $\nu_1 = 46.80$
$r_2 = -0.6814$
$d_2 = 0.0157$
$r_4 = 0.1957$
$d_4 = 0.1283$ $n_3 = 1.74320$ $\nu_3 = 52.55$
$r_5 = 0.1396$
$d_5 = 0.2079$
$r_6 = -0.1124$
$d_6 = 0.1545$ $n_4 = 1.59270$ $\nu_4 = 33.56$
$r_7 = -0.7695$
$d_7 = 0.0695$ $n_5 = 1.49700$ $\nu_5 = 89.16$
$r_9 = -0.2295$
$d_9 = 0.0166$
$r_{10} = 4.9102$
$d_{10} = 0.0828$ $n_7 = 1.62041$ $\nu_7 = 56.52$
$r_{11} = -0.5041$
$d_{11} = 0.0050$
$r_{12} = -7.3769$

EMBODIMENT 6-continued

|  |  |  |
|---|---|---|
| $d_{12} = 0.0255$ | $n_8 = 1.61340$ | $\nu_8 = 62.43$ |
| $r_{13} = 0.5607$ |  |  |
| $d_{13} = 0.1241$ | $n_9 = 1.43389$ | $\nu_9 = 95.15$ |
| $r_{14} = -0.3267$ |  |  |
| $d_{14} = 0.0255$ | $n_{10} = 1.61340$ | $\nu_{10} = 62.43$ |
| $r_{15} = -0.6205$ |  |  |
| $\theta_4 = 0.590$ | $\theta_5 = 0.539$ | $\dfrac{\theta_4 - \theta_5}{\nu_5 - \nu_4} = 0.000917$ |

EMBODIMENT 7

| $f = 1.0$ | $N.A = 0.16$ | $\beta = -4X$ | $W.D = 0.2677$ |
|---|---|---|---|
| $r_1 = 0.4732$ |  |  |  |
| $d_1 = 0.0591$ | $n_1 = 1.80610$ | $\nu_1 = 40.95$ |  |
| $r_2 = -2.0957$ |  |  |  |
| $d_2 = 0.0053$ |  |  |  |
| $r_4 = 0.2435$ |  |  |  |
| $d_4 = 0.1344$ | $n_3 = 1.74320$ | $\nu_3 = 49.41$ |  |
| $r_5 = 0.1317$ |  |  |  |
| $d_5 = 0.1475$ |  |  |  |
| $r_6 = -0.1313$ |  |  |  |
| $d_6 = 0.1284$ | $n_4 = 1.59551$ | $\nu_4 = 39.21$ |  |
| $r_7 = -0.6285$ |  |  |  |
| $d_7 = 0.1516$ | $n_5 = 1.49700$ | $\nu_5 = 81.34$ |  |
| $r_9 = -0.3001$ |  |  |  |
| $d_9 = 0.0053$ |  |  |  |
| $r_{10} = 1.7457$ |  |  |  |
| $d_{10} = 0.0879$ | $n_7 = 1.43389$ | $\nu_7 = 95.15$ |  |
| $r_{11} = -0.4346$ |  |  |  |
| $d_{11} = 0.0053$ |  |  |  |
| $r_{12} = 3.4323$ |  |  |  |
| $d_{12} = 0.0401$ | $n_8 = 1.62041$ | $\nu_8 = 60.27$ |  |
| $r_{13} = 0.4733$ |  |  |  |
| $d_{13} = 0.1252$ | $n_9 = 1.43389$ | $\nu_9 = 95.15$ |  |
| $r_{14} = -0.3464$ |  |  |  |
| $d_{14} = 0.0400$ | $n_{10} = 1.62041$ | $\nu_{10} = 60.27$ |  |
| $r_{15} = -0.6177$ |  |  |  |
| $\theta_4 = 0.577$ | $\theta_5 = 0.539$ | $\dfrac{\theta_4 - \theta_5}{\nu_5 - \nu_4} = 0.000902$ |  | wherein the reference symbols $r_1$ through $r_{15}$ represent radii of curvature on the surfaces of the respective lens elements, the reference symbols $d_1$ through $d_{14}$ designate thicknesses of the respective lens elements and airspaces therebetween, the reference symbols $n_1$ through $n_{10}$ denote refractive indices of the respective lens elements and the reference symbols $\nu_1$ through $\nu_{10}$ represent Abbe's numbers of the respective lens elements.

Of the embodiment mentioned above, the Embodiment 1 has such a composition as shown in FIG. 1. Speaking concretely, the front lens group comprises a first positive lens component and a second cemented meniscus lens component, whereas the rear lens group consists of a third cemented three-element lens component and a fourth positive lens component. Therefore, $\Sigma d/n$ is equal to $d_6/n_4 + d_7/n_5 + d_8/n_6$ in condition (1). In the condition (2), $\nu_p$, $\nu_n$, $\nu_{p'}$ and $\nu_{n'}$ correspond to $\nu_1$, $\nu_3$, $\nu_5$ and $\nu_6$, and $\nu_4$ respectively. Therefore, $45 \leq |\nu_p - \nu_n| + |\nu_{n'} - \nu_{p'}| \leq 105$ in the condition (2) means $45 \leq |\nu_1 - \nu_3| + |\nu_4 - \nu_5| \leq 105$ and $45 \leq |\nu_1 - \nu_3| + |\nu_4 - \nu_6| \leq 105$.

Figure 3:
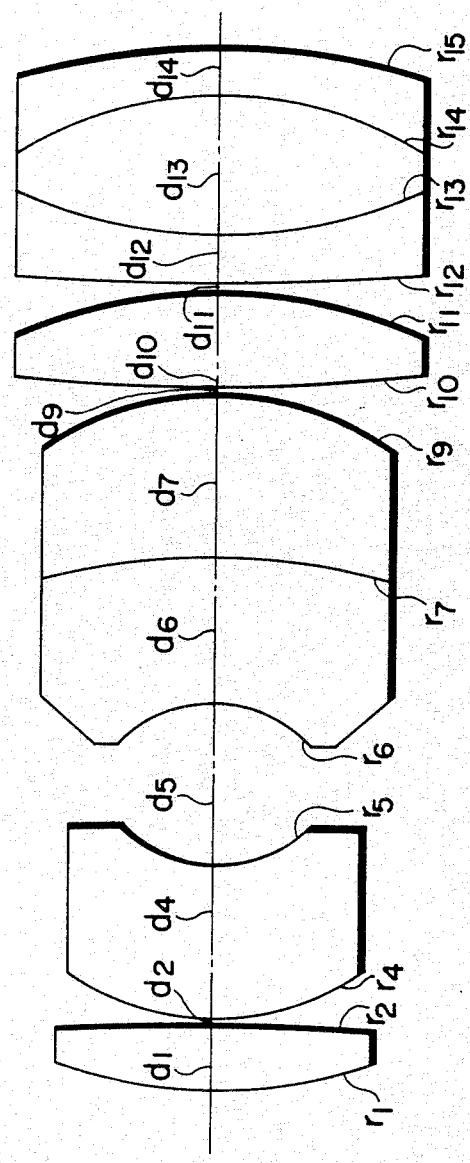
FIG. 3 shows a sectional view illustrating the composition of the Embodiment 2 of the present invention.
Figure 4:
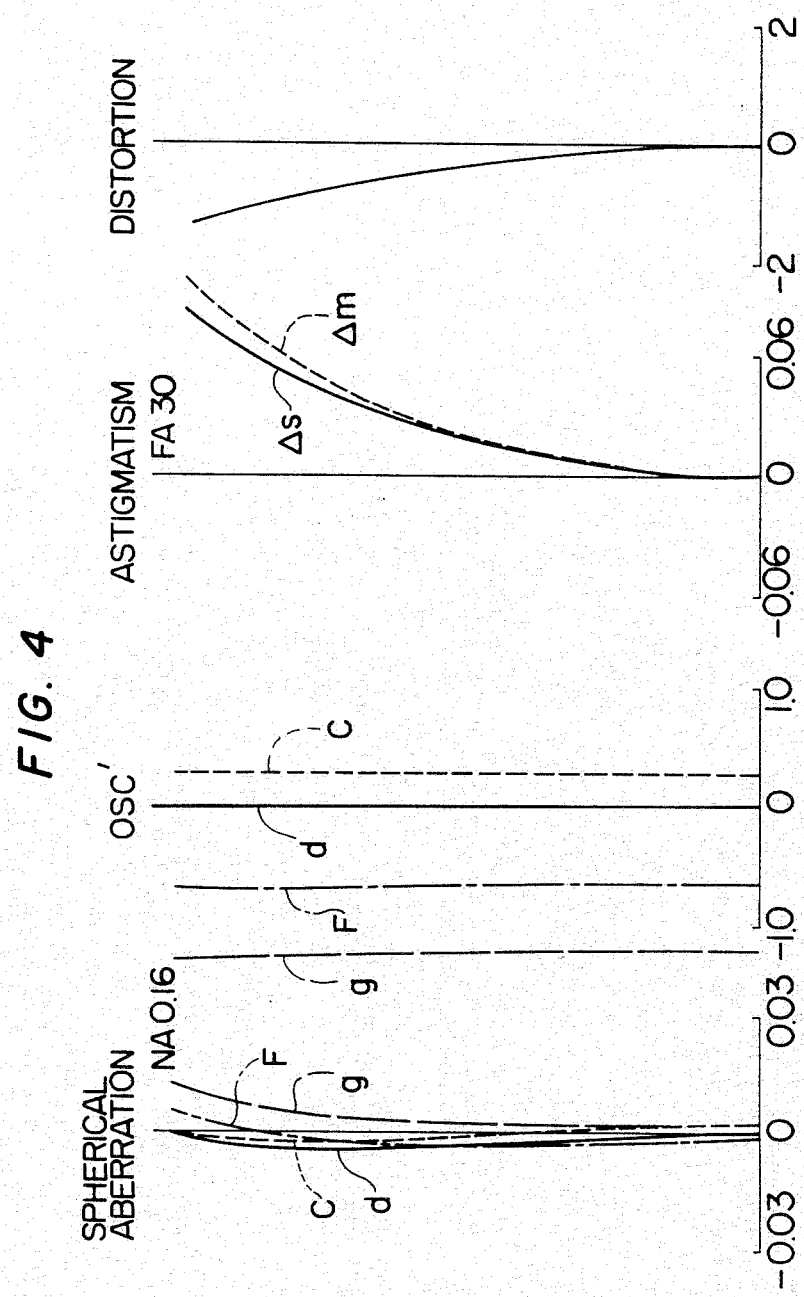
FIG. 4 illustrates curves showing the aberration characteristics of the Embodiment 2.
Figure 5:
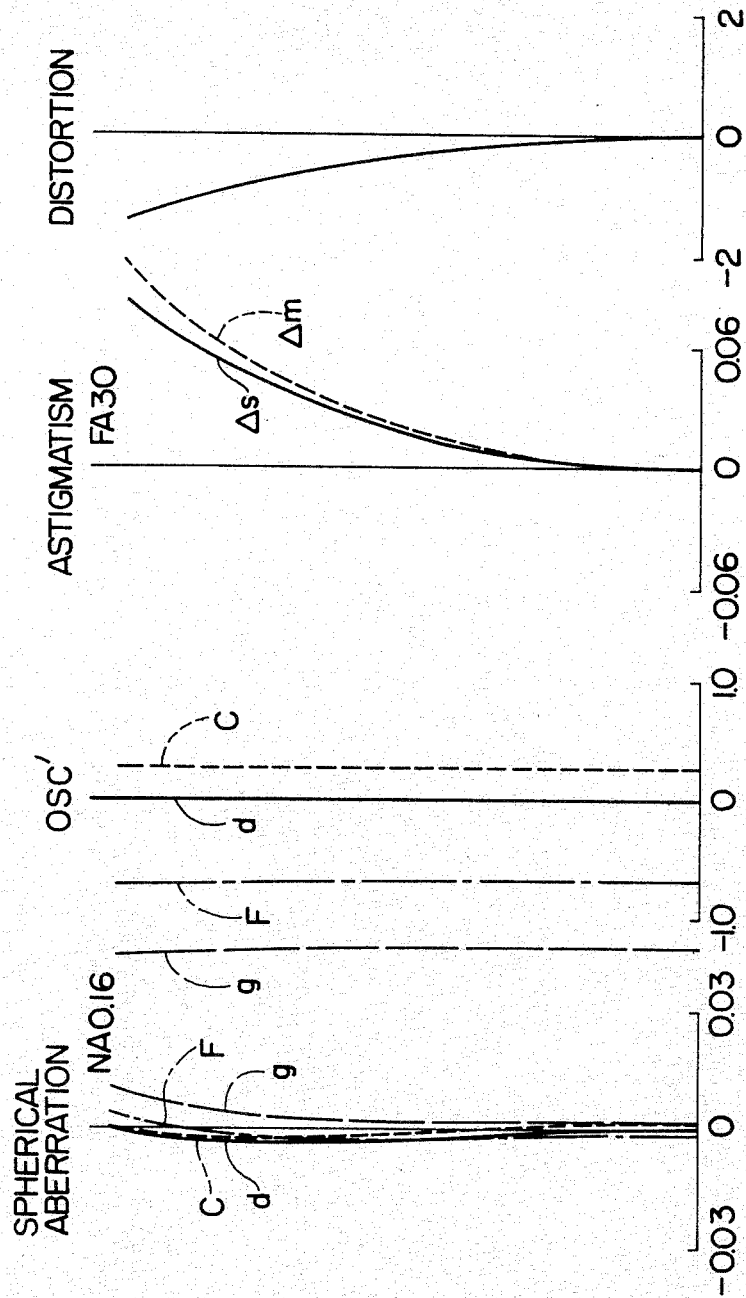
FIG. 5 illustrates graphs visualizing the aberration characteristics of the Embodiment 3.
Figure 6:
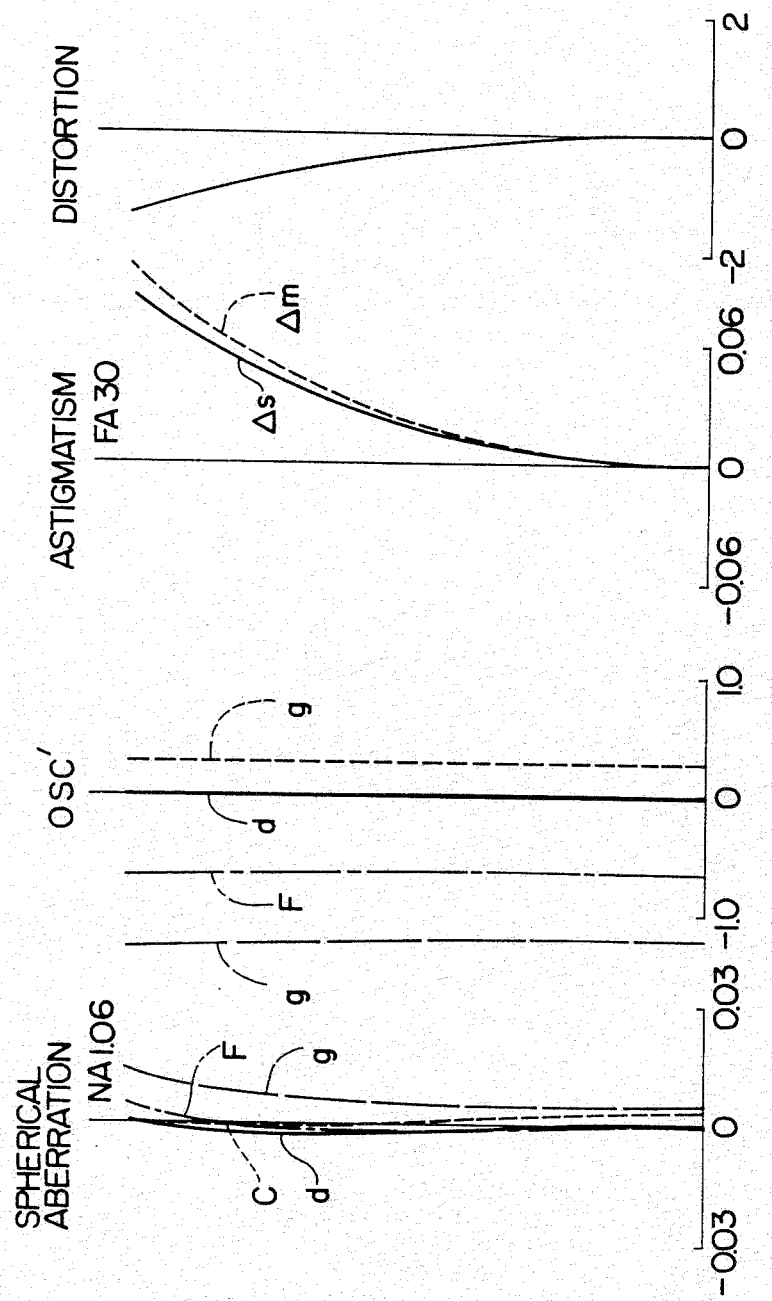
FIG. 6 illustrates graphs visualizing the aberration characteristics of the Embodiment 4.
Figure 7:
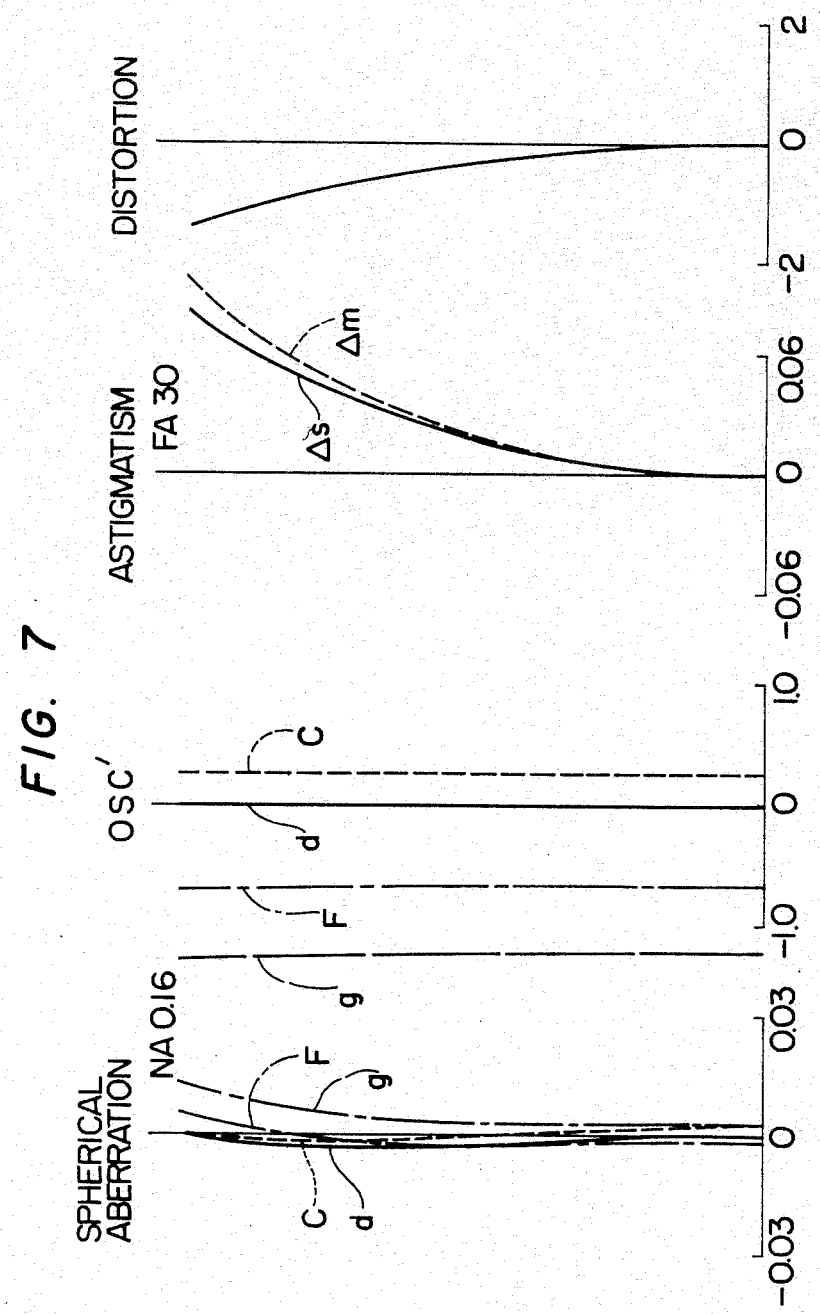
FIG. 7 shows curves visualizing the aberration characteristics of the Embodiment 5.
Figure 8:
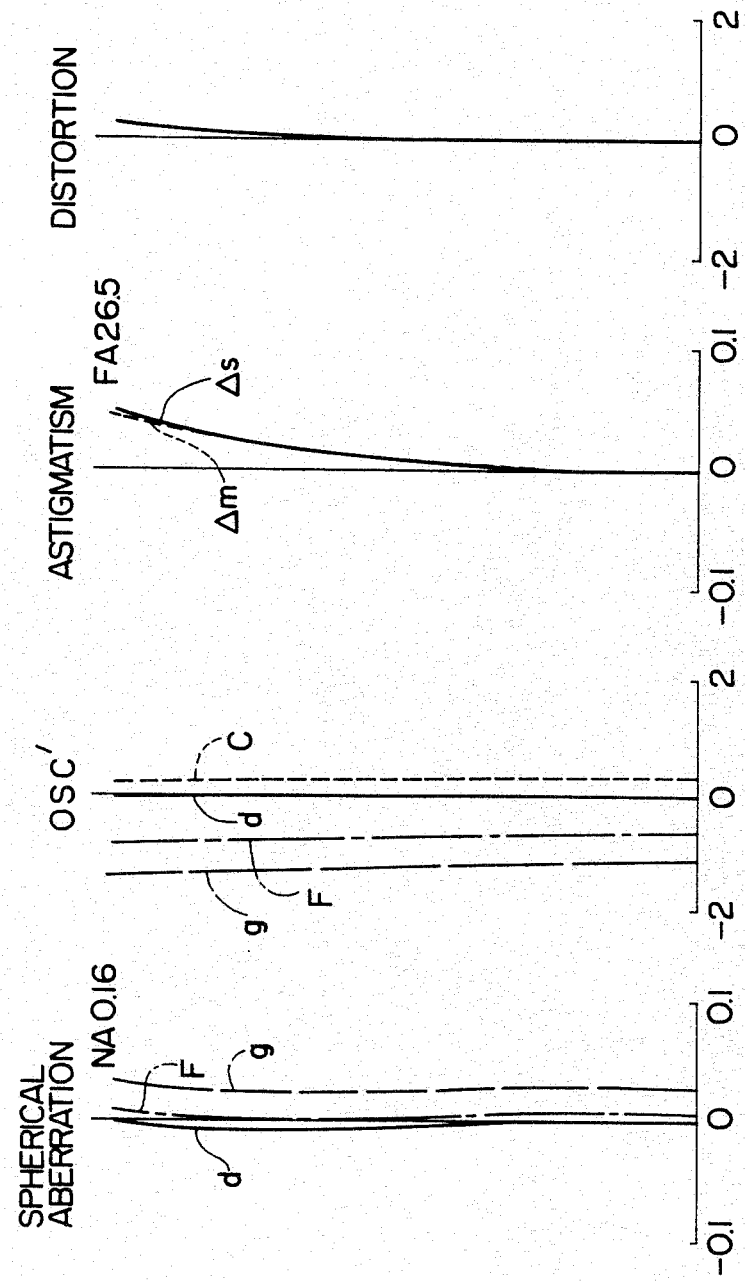
FIG. 8 shows graphs visualizing the aberration characteristics of the Embodiment 6.
Figure 9:
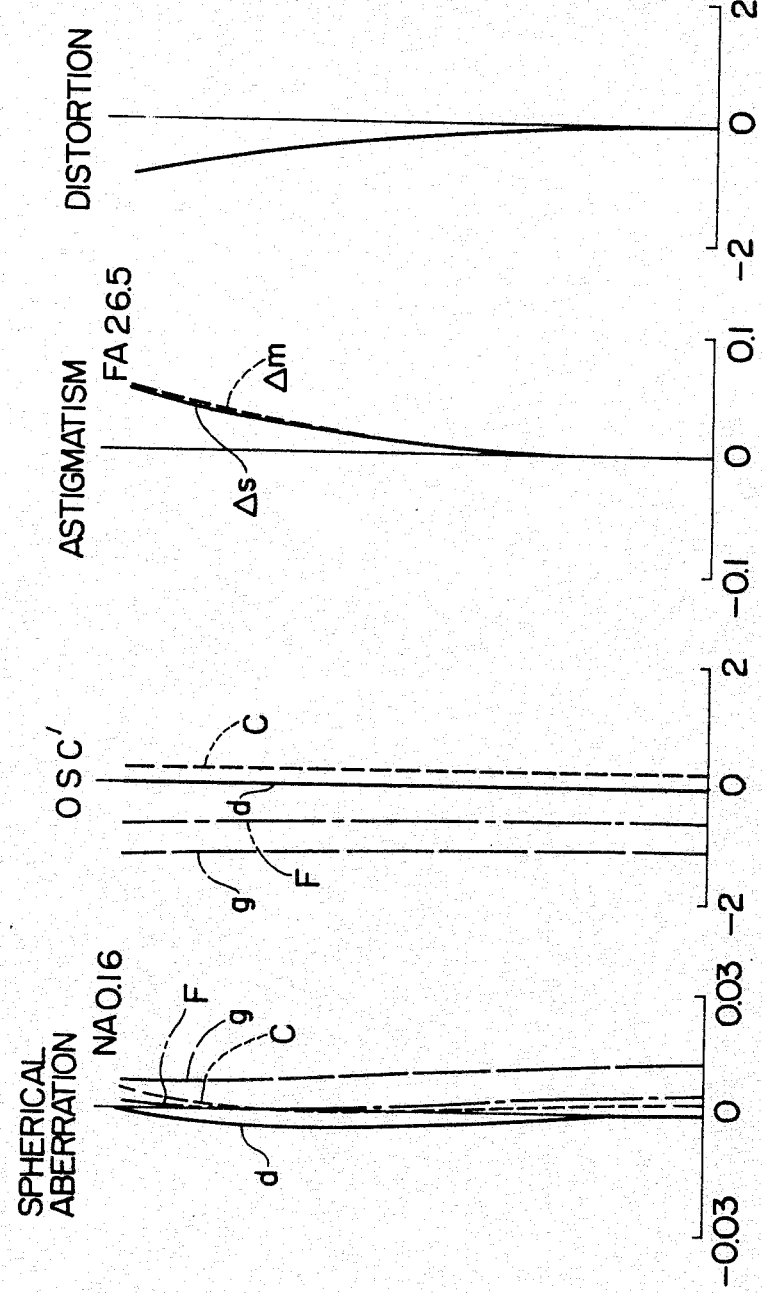
FIG. 9 shows curves illustrating the aberration characteristics of the Embodiment 7.

The Embodiments 2 through 7 have such a common composition as shown in FIG. 3 wherein the front lens group comprises a first positive lens component and a second meniscus lens component, whereas the rear lens group consists of a third meniscus doublet lens component, fourth positive lens component and a fifth cemented three-element lens component. Hence, the reference symbol $\Sigma d/n$ used in the condition (1) means $d_6/n_4 + d_7/n_5$, and the reference symbols $\nu_p$, $\nu_n$, $\nu_{p'}$ and $\nu_{n'}$ used in the condition (2) correspond to $\nu_1$, $\nu_3$, $\nu_5$ and $\nu_4$ respectively. Further, the reference symbols $r_3$, $d_3$, $n_2$ and $\nu_2$ are not used since the second lens component consists of a single lens element, and the reference symbols $r_8$, $d_8$, $n_6$ and $\nu_6$ are neither used since the third lens component is a cemented doublet component.

We claim:

1. An objective lens system for microscopes comprising a front lens group and a rear lens group, said front lens group consisting of a first positive lens component and a second negative meniscus lens component having a concave surface on the image side, and said rear lens group comprising at least two lens components including a cemented three element component, said rear lens group comprising a third cemented meniscus lens component having a concave surface on the object side and a fourth positive lens component, and said objective lens system satisfying the following conditions:

$$0.12f < d/n < 0.2f \quad (1)$$

$$45 \leq |\nu_p - \nu_n| + |\nu_{n'} - \nu_{p'}| \leq 105 \quad (2)$$

$$0.8 < |r_6/r_5| < 1.1 \quad (3)$$

wherein the reference symbols $r_5$ and $r_6$ represent radii of curvature on the image side surface of the second lens component and the object side surface of the third lens component, the reference symbol $\Sigma d/n$ designates total sum of ratios between thicknesses and refractive indices of the respective lens elements of the third lens component, the reference symbols $\nu_p$ and $\nu_n$ denote Abbe's numbers of the first lens component and the negative element of the second lens component in the front lens group, the reference symbols $\nu_{p'}$ and $\nu_{n'}$ represent Abbe's numbers of the positive lens element and negative lens element of the third lens component in the rear lens group and the reference symbol f designates focal length of the entire lens system as a whole.

2. An objective lens system for microscopes according to claim 1 wherein said rear lens group consists of two lens components of said third and fourth lens components, and said third lens component is a three-element lens component having a concave surface on the object side.

3. An objective lens system for microscopes according to claim 2 having the following numerical data:

| $f = 1.0$ | $N.A = 0.16$ $\beta = -4X$ | $W.D = 0.7141$ |
|---|---|---|
| $r_1 = 0.4823$ |  |  |
| $d_1 = 0.0814$ | $n_1 = 1.49250$ | $\nu_1 = 81.90$ |
| $r_2 = -1.1061$ |  |  |
| $d_2 = 0.0044$ |  |  |
| $r_3 = 0.2743$ |  |  |
| $d_3 = 0.1278$ | $n_2 = 1.65844$ | $\nu_2 = 51.33$ |
| $r_4 = -3.7731$ |  |  |
| $d_4 = 0.0235$ | $n_3 = 1.53256$ | $\nu_3 = 45.61$ |
| $r_5 = 0.1584$ |  |  |
| $d_5 = 0.1440$ |  |  |
| $r_6 = -0.1602$ |  |  |
| $d_6 = 0.0223$ | $n_4 = 1.72825$ | $\nu_4 = 29.23$ |
| $r_7 = -20.3323$ |  |  |
| $d_7 = 0.1579$ | $n_5 = 1.43389$ | $\nu_5 = 95.15$ |
| $r_8 = -1.3149$ |  |  |
| $d_8 = 0.0721$ | $n_6 = 1.63854$ | $\nu_6 = 54.91$ |
| $r_9 = -0.3140$ |  |  |
| $d_9 = 0.0044$ |  |  |
| $r_{10} = -4.8690$ |  |  |
| $d_{10} = 0.0853$ | $n_7 = 1.49250$ | $\nu_7 = 81.90$ |
| $r_{11} = -0.4933$ |  |  | wherein the reference symbols $r_1$ through $r_{11}$ represent radii of curvature on the surfaces of the respective lens elements, the reference symbols $d_1$ through $d_{10}$ designate thicknesses of the respective lens elements and airspaces therebetween, the reference symbols $n_1$ through $n_7$ denote refractive indices of the respective lens elements and the reference symbols $v_1$ through $v_7$ represent Abbe's numbers of the respective lens elements.

4. An objective lens system for microscopes according to claim 1 wherein said rear lens group consists of a third cemented meniscus lens component, a fourth positive lens component and a fifth cemented three-element lens component.

5. An objective lens system for microscope according to claim 4 additionally satisfying the following conditions:

$$0 \leq \frac{\theta_4 - \theta_5}{v_5 - v_4} \leq 0.001 \quad (4)$$

$$1.85 > n_1 > 1.8 \quad (5)$$

$$0.4f < \frac{d_4}{n_3} + d_5 + \frac{d_6}{n_4} + \frac{d_7}{n_5} < 0.45f \quad (6)$$

$$1.5 < \frac{n_5 - 1}{|r_9|} f < 2.2 \quad (7)$$

$$0.9 < \frac{n_7 - 1}{|r_{11}|} f < 1.3 \quad (8)$$

wherein the reference symbols $r_9$ and $r_{11}$ represent radii of curvature on the image side surfaces of the third lens component and the image side surface of the fourth lens component respectively, the reference symbols $d_4$, $d_6$ and $d_7$ designate thicknesses of the second lens component and both the lens element of the third lens component, the reference symbol $d_5$ denotes the airspace formed between the second and third lens components, the reference symbols $n_1$, $n_3$, $n_4$, $n_5$ and $n_7$ represent refractive indices of the first lens component, the second lens component, both the lens elements of the third lens component and the fourth lens component, the reference symbols $v_4$ and $v_5$ designate Abbe's numbers of both the lens elements of the third lens component, the reference symbols $\theta_4$ abd $\theta_5$ denote values of both the lens elements of the third lens component given by $$\theta = \frac{n_g - n_F}{n_F - n_C}$$

and the reference symbol f represents focal length of the entire lens system as a whole.

6. An objective lens system for microscopes according to claim 5 having the following numerical data:

| f = 1.0 | N.A = 0.16 β = −4X | W.D = 0.2736 |
|---|---|---|
| $r_1 = 0.6326$ | | |
| $d_1 = 0.0624$ | $n_1 = 1.83400$ | $v_1 = 37.19$ |
| $r_2 = -1.5353$ | | |
| $d_2 = 0.0054$ | | |
| $r_4 = 0.2435$ | | |
| $d_4 = 0.1373$ | $n_3 = 1.71300$ | $v_3 = 53.89$ |
| $r_5 = 0.1401$ | | |
| $d_5 = 0.1504$ | | |
| $r_6 = -0.1409$ | | |
| $d_6 = 0.2035$ | $n_4 = 1.61340$ | $v_4 = 43.84$ |
| $r_7 = -1.5682$ | | |
| $d_7 = 0.0817$ | $n_5 = 1.49700$ | $v_5 = 81.60$ |
| $r_9 = -0.3138$ | | |
| $d_9 = 0.0136$ | | |
| $r_{10} = 4.8966$ | | |
| $d_{10} = 0.0817$ | $n_7 = 1.43389$ | $v_7 = 95.15$ |
| $r_{11} = -0.4277$ | | |
| $d_{11} = 0.0054$ | | |
| $r_{12} = 3.0712$ | | |
| $d_{12} = 0.0403$ | $n_8 = 1.64000$ | $v_8 = 60.09$ |
| $r_{13} = 0.4846$ | | |
| $d_{13} = 0.1150$ | $n_9 = 1.49700$ | $v_9 = 81.60$ |
| $r_{14} = -0.3910$ | | |
| $d_{14} = 0.0531$ | $n_{10} = 1.52130$ | $v_{10} = 52.55$ |
| $r_{15} = -0.9323$ | | | wherein the reference symbols $r_1$ through $r_{15}$ represent radii of curvature on the surfaces of the respective lens elements, the reference symbol $d_1$ through $d_{14}$ designate thicknesses of the respective lens elements and airspaces therebetween, the reference symbols $n_1$ through $n_{10}$ denote refractive indices of the respective lens elements and the reference symbols $v_1$ through $v_{10}$ represent Abbe's numbers of the respective lens elements.

7. An objective lens system for microscopes according to claim 5 having the following numerical data:

| f = 1.0 | N.A = 0.16 β = −4X | W.D = 0.2753 |
|---|---|---|
| $r_1 = 0.6773$ | | |
| $d_1 = 0.0608$ | $n_1 = 1.83400$ | $v_1 = 37.19$ |
| $r_2 = -1.5184$ | | |
| $d_2 = 0.0055$ | | |
| $r_4 = 0.2418$ | | |
| $d_4 = 0.1382$ | $n_3 = 1.72600$ | $v_3 = 53.56$ |
| $r_5 = 0.1415$ | | |
| $d_5 = 0.1516$ | | |
| $r_6 = -0.1406$ | | |
| $d_6 = 0.2046$ | $n_4 = 1.61340$ | $v_4 = 43.84$ |
| $r_7 = -1.0627$ | | |
| $d_7 = 0.0822$ | $n_5 = 1.49700$ | $v_5 = 81.60$ |
| $r_9 = -0.3129$ | | |
| $d_9 = 0.0137$ | | |
| $r_{10} = 3.0907$ | | |
| $d_{10} = 0.0822$ | $n_7 = 1.43389$ | $v_7 = 95.15$ |
| $r_{11} = -0.4372$ | | |
| $d_{11} = 0.0055$ | | |
| $r_{12} = 3.4568$ | | |
| $d_{12} = 0.0414$ | $n_8 = 1.65160$ | $v_8 = 58.67$ |
| $r_{13} = 0.4957$ | | |
| $d_{13} = 0.1287$ | $n_9 = 1.49700$ | $v_9$ 81.60 |
| $r_{14} = -0.3606$ | | |
| $d_{14} = 0.0412$ | $n_{10} = 1.55781$ | $v_{10} = 53.85$ |
| $r_{15} = -0.8637$ | | | wherein the reference symbols $r_1$ through $r_{15}$ represent radii of curvature on the surfaces of the respective lens elements, the reference symbols $d_1$ through $d_{14}$ designate thicknesses of the respective lens elements and airspaces therebetween, the reference symbols $n_1$ through $n_{10}$ denote refractive indices of the respective lens elements and the reference symbols $v_1$ through $v_{10}$ represent Abbe's numbers of the respective lens elements.

8. An objective lens system for microscopes according to claim 5 having the following numerical data:

| f = 1.0 | N.A = 0.16 β= −4X | W.D = 0.2732 |
|---|---|---|
| $r_1 = 0.6327$ | | |
| $d_1 = 0.0602$ | $n_1 = 1.83400$ | $v_1 = 37.19$ |
| $r_2 = -1.4982$ | | |
| $d_2 = 0.0054$ | | |
| $r_4 = 0.2441$ | | |
| $d_4 = 0.1372$ | $n_3 = 1.72600$ | $v_3 = 53.56$ |
| $r_5 = 0.1400$ | | |
| $d_5 = 0.1504$ | | |
| $r_6 = -0.1409$ | | |
| $d_6 = 0.2031$ | $n_4 = 1.61340$ | $v_4 = 43.84$ |
| $r_7 = -1.4709$ | | |

-continued

| | | |
|---|---|---|
| $d_7 = 0.0816$ | $n_5 = 1.49700$ | $\nu_5 = 81.60$ |
| $r_9 = -0.3152$ | | |
| $d_9 = 0.0136$ | | |
| $r_{10} = 4.8481$ | | |
| $d_{10} = 0.0816$ | $n_7 = 1.43389$ | $\nu_7 = 95.15$ |
| $r_{11} = -0.4291$ | | |
| $d_{11} = 0.0054$ | | |
| $r_{12} = 3.0253$ | | |
| $d_{12} = 0.0410$ | $n_8 = 1.65160$ | $\nu_8 = 58.67$ |
| $r_{13} = 0.4934$ | | |
| $d_{13} = 0.1276$ | $n_9 = 1.49700$ | $\nu_9 = 81.60$ |
| $r_{14} = -0.3929$ | | |
| $d_{14} = 0.0408$ | $n_{10} = 1.52130$ | $\nu_{10} = 52.55$ |
| $r_{15} = -0.8983$ | | | wherein the reference symbols $r_1$ through $r_{15}$ represent radii of curvature on the surfaces of the respective lens elements, the reference symbols $d_1$ through $d_{14}$ designate thicknesses of the respective lens elements and airspaces therebetween, the reference symbols $n_1$ through $n_{10}$ denote refractive indices of the respective lens elements and the reference symbols $\nu_1$ through $\nu_{10}$ represent Abbe's numbers of the respective lens elements.

9. An objective lens system for microscopes according to claim 5 having the following numerical data:

| | | |
|---|---|---|
| $f = 1.0$ | $N.A = 0.16\ \beta = -4X$ | $W.D = 0.2740$ |
| $r_1 = 0.6480$ | | |
| $d_1 = 0.0604$ | $n_1 = 1.83400$ | $\nu_1 = 37.19$ |
| $r_2 = -1.4720$ | | |
| $d_2 = 0.0055$ | | |
| $r_4 = 0.2452$ | | |
| $d_4 = 0.1376$ | $n_3 = 1.72600$ | $\nu_3 = 53.56$ |
| $r_5 = 0.1414$ | | |
| $d_5 = 0.1508$ | | |
| $r_6 = -0.1410$ | | |
| $d_6 = 0.2036$ | $n_4 = 1.61340$ | $\nu_4 = 43.84$ |
| $r_7 = -1.6897$ | | |
| $d_7 = 0.0818$ | $n_5 = 1.49700$ | $\nu_5 = 81.60$ |
| $r_9 = -0.3145$ | | |
| $d_9 = 0.0136$ | | |
| $r_{10} = 5.6253$ | | |
| $d_{10} = 0.0818$ | $n_7 = 1.43389$ | $\nu_7 = 95.15$ |
| $r_{11} = -0.4267$ | | |
| $d_{11} = 0.0055$ | | |
| $r_{12} = 2.9647$ | | |
| $d_{12} = 0.0411$ | $n_8 = 1.64000$ | $\nu_8 = 60.09$ |
| $r_{13} = 0.4937$ | | |
| $d_{13} = 0.1280$ | $n_9 = 1.49700$ | $\nu_9 = 81.60$ |
| $r_{14} = -0.3936$ | | |
| $d_{14} = 0.0409$ | $n_{10} = 1.52130$ | $\nu_{10} = 52.55$ |
| $r_{15} = 0.9338$ | | | wherein the reference symbols $r_1$ through $r_{15}$ represent radii of curvature on the surfaces of the respective lens elements, the reference symbols $d_1$ through $d_{14}$ designate thicknesses of the respective lens elements and airspaces therebetween, the reference symbols $n_1$ through $n_{10}$ denote refractive indices of the respective lens elements and the reference symbols $\nu_1$ through $\nu_{10}$ represent Abbe's numbers of the respective lens elements.

10. An objective lens system for microscopes according to claim 5 having the following numerical data:

| | | |
|---|---|---|
| $f = 1.0$ | $N.A = 0.16\ \beta = -4X$ | $W.D = 0.3055$ |
| $r_1 = 2.1020$ | | |
| $d_1 = 0.0527$ | $n_1 = 1.80400$ | $\nu_1 = 46.80$ |
| $r_2 = -0.6814$ | | |
| $d_2 = 0.0157$ | | |
| $r_4 = 0.1957$ | | |
| $d_4 = 0.1283$ | $n_3 = 1.74320$ | $\nu_3 = 52.55$ |
| $r_5 = 0.1396$ | | |
| $d_5 = 0.2079$ | | |
| $r_6 = -0.1124$ | | |
| $d_6 = 0.1545$ | $n_4 = 1.59270$ | $\nu_4 = 33.56$ |
| $r_7 = -0.7695$ | | |
| $d_7 = 0.0695$ | $n_5 = 1.49700$ | $\nu_5 = 89.16$ |
| $r_9 = -0.2295$ | | |
| $d_9 = 0.0166$ | | |
| $r_{10} = 4.9102$ | | |
| $d_{10} = 0.0828$ | $n_7 = 1.62041$ | $\nu_7 = 56.52$ |
| $r_{11} = -0.5041$ | | |
| $d_{11} = 0.0050$ | | |
| $r_{12} = -7.3769$ | | |
| $d_{12} = 0.0255$ | $n_8 = 1.61340$ | $\nu_8 = 62.43$ |
| $r_{13} = 0.5607$ | | |
| $d_{13} = 0.1241$ | $n_9 = 1.43389$ | $\nu_9 = 95.15$ |
| $r_{14} = -0.3267$ | | |
| $d_{14} = 0.0255$ | $n_{10} = 1.61340$ | $\nu_{10} = 62.43$ |
| $r_{15} = -0.6205$ | | | wherein the reference symbols $r_1$ through $r_{15}$ represent radii of curvature on the surfaces of the respective lens elements, the reference symbols $d_1$ through $d_{14}$ designate thicknesses of the respective lens elements and airspaces therebetween, the reference symbols $n_1$ through $n_{10}$ denote refractive indices of the respective lens elements and the reference symbols $\nu_1$ through $\nu_{10}$ represent Abbe's numbers of the respective lens elements.

11. An objective lens system for microscopes according to claim 5 having the following numerical data:

| | | |
|---|---|---|
| $f = 1.0$ | $N.A = 0.16\ \beta = -4X$ | $W.D = 0.2677$ |
| $r_1 = 0.4732$ | | |
| $d_1 = 0.0591$ | $n_1 = 1.80610$ | $\nu_1 = 40.95$ |
| $r_2 = -2.0957$ | | |
| $d_2 = 0.0053$ | | |
| $r_4 = 0.2435$ | | |
| $d_4 = 0.1344$ | $n_3 = 1.74320$ | $\nu_3 = 49.41$ |
| $r_5 = 0.1317$ | | |
| $d_5 = 0.1475$ | | |
| $r_6 = -0.1313$ | | |
| $d_6 = 0.1284$ | $n_4 = 1.59551$ | $\nu_4 = 39.21$ |
| $r_7 = -0.6285$ | | |
| $d_7 = 0.1516$ | $n_5 = 1.49700$ | $\nu_5 = 81.34$ |
| $r_9 = -0.3001$ | | |
| $d_9 = 0.0053$ | | |
| $r_{10} = 1.7457$ | | |
| $d_{10} = 0.0879$ | $n_7 = 1.43389$ | $\nu_7 = 95.15$ |
| $r_{11} = -0.4346$ | | |
| $d = 0.0053$ | | |
| $r_{12} = 3.4323$ | | |
| $d_{12} = 0.0401$ | $n_8 = 1.62041$ | $\nu_8 = 60.27$ |
| $r_{13} = 0.4733$ | | |
| $d_{13} = 0.1252$ | $n_9 = 1.43389$ | $\nu_9 = 95.15$ |
| $r_{14} = -0.3464$ | | |
| $d_{14} = 0.0400$ | $n_{10} = 1.62041$ | $\nu_{10} = 60.27$ |
| $r_{15} = -0.6177$ | | | wherein the reference symbols $r_1$ through $r_{15}$ represent radii of curvature on the surfaces of the respective lens elements, the reference symbols $d_1$ through $d_{14}$ designate thicknesses of the respective lens elements and airspaces therebetween, the reference symbols $n_1$ through $n_{10}$ denote refractive indices of the respective lens elements and the reference symbols $\nu_1$ through $\nu_{10}$ represent Abbe's numbers of the respective lens elements.

* * * * *